US009393985B2

(12) United States Patent
Cho

(10) Patent No.: US 9,393,985 B2
(45) Date of Patent: Jul. 19, 2016

(54) APPARATUS FOR ATTACHING A HEATING ELEMENT TO A STEERING WHEEL

(75) Inventor: Man Ho Cho, Gyeonggi-do (KR)

(73) Assignee: HWAJIN CO., LTD., Gyeongsangbuk-Do (KR)

(*) Notice: Subject to any disclaimer, the term of this patent is extended or adjusted under 35 U.S.C. 154(b) by 731 days.

(21) Appl. No.: 13/580,719

(22) PCT Filed: Feb. 23, 2011

(86) PCT No.: PCT/KR2011/001205
§ 371 (c)(1),
(2), (4) Date: Aug. 23, 2012

(87) PCT Pub. No.: WO2011/105765
PCT Pub. Date: Sep. 1, 2011

(65) Prior Publication Data
US 2012/0312796 A1 Dec. 13, 2012

(30) Foreign Application Priority Data

Feb. 23, 2010 (KR) .................. 10-2010-0016346

(51) Int. Cl.
*H05B 3/46* (2006.01)
*B05C 1/00* (2006.01)
*B62D 1/06* (2006.01)
*H05B 3/34* (2006.01)

(52) U.S. Cl.
CPC *B62D 1/065* (2013.01); *H05B 3/34* (2013.01); *H05B 2203/005* (2013.01); *H05B 2203/013* (2013.01)

(58) Field of Classification Search
CPC .............. B05C 1/00; B05C 1/02; B05C 1/027
USPC .................... 219/204; 118/264–268
See application file for complete search history.

(56) References Cited

U.S. PATENT DOCUMENTS

| 1,572,205 | A | * | 2/1926 | Harding | ............... 118/239 |
| 4,631,976 | A | | 12/1986 | Noda et al. | |
| 4,919,970 | A | * | 4/1990 | Hoebener et al. | ............ 427/97.8 |
| 5,847,360 | A | | 12/1998 | Lorenzen et al. | |

(Continued)

FOREIGN PATENT DOCUMENTS

| CN | 1738739 A | 2/2006 |
| CN | 1010228829 A | 9/2007 |

(Continued)

OTHER PUBLICATIONS

Japanese Patent Office; Office Action in Japanese Patent Application No. 2012-554924 (Dec. 20, 2013).

(Continued)

*Primary Examiner* — David Angwin
*Assistant Examiner* — Amit K Singh
(74) *Attorney, Agent, or Firm* — Leydig, Voit & Mayer, Ltd.

(57) ABSTRACT

A steering wheel having a heating element is manufactured by directly transferring a transfer film on which an esthetic decoration pattern is printed. The heating element is an electrically conductive paste on a surface of a rim, and includes heating lines that are electrically separated from each other, and a connection unit that electrically short-circuits ends of the heating lines. Power is supplied to the heating element through the connection unit.

7 Claims, 11 Drawing Sheets

(56) References Cited

U.S. PATENT DOCUMENTS

| | | | |
|---|---|---|---|
| 6,727,467 B1 | 4/2004 | Hadzizukic et al. | |
| 8,188,406 B2 | 5/2012 | Asami et al. | |
| 8,408,157 B2 * | 4/2013 | Ling | 118/264 |
| 8,424,480 B2 * | 4/2013 | Wentworth | B60S 3/042 118/244 |
| 2007/0210050 A1 | 9/2007 | Choi | |
| 2007/0221646 A1 | 9/2007 | Shin et al. | |
| 2007/0272439 A1 | 11/2007 | Kim et al. | |
| 2008/0136889 A1 * | 6/2008 | Yoon et al. | 347/141 |
| 2008/0210048 A1 | 9/2008 | Yoneyama et al. | |
| 2011/0042370 A1 | 2/2011 | Choi et al. | |

FOREIGN PATENT DOCUMENTS

| | | |
|---|---|---|
| CN | 101274637 A | 10/2008 |
| JP | 60-102169 U | 7/1985 |
| JP | 61-81270 A | 4/1986 |
| JP | 3174796 A | 7/1991 |
| JP | 9-183378 A | 7/1997 |
| JP | 2003-317905 A | 11/2003 |
| JP | 2007290685 A | 11/2007 |
| JP | 2007-324426 A | 12/2007 |
| KR | 91-11426 U | 7/1991 |
| KR | 1992-0019598 A | 11/1992 |
| KR | 98-2418 U | 3/1998 |
| KR | 1998-053031 U | 10/1998 |
| KR | 1020030018737 A | 3/2003 |
| KR | 1020030066573 A | 8/2003 |
| KR | 1020060112926 A | 11/2006 |
| KR | 100762147 B1 | 9/2007 |
| KR | 1020080051739 A | 6/2008 |
| WO | WO 2005/009824 A1 | 2/2005 |
| WO | WO 2009/116787 A2 | 9/2009 |

OTHER PUBLICATIONS

State Intellectual Property Office of the People's Republic of China; First Office Action in Chinese Patent Application No. 201180010770.9 (Mar. 26, 2014).

International Search Report issued in Application No. PCT/KR/2011/001205, mailed Oct. 31, 2011.

* cited by examiner

APPARATUS FOR ATTACHING A HEATING ELEMENT TO A STEERING WHEEL

This application claims the benefit of Korean Patent Application No. 10-2010-016346, filed on Feb. 23, 2010, in the Korean Intellectual Property Office, the disclosure of which is incorporated herein in its entirety by reference.

TECHNICAL FIELD

The present invention relates to a steering wheel having a heating element and an apparatus for attaching the heating element to the steering wheel, and more particularly, to a steering wheel having a heating element that can continuously generate heat despite a defect therein, whereby an increase in the diameter of the steering wheel is minimized in spite of attachment of the heating element to the steering wheel, and a surface of the heating element can be finished by directly transferring thereon a transfer film on which an artistic decoration-pattern such as a wood pattern is printed, and an apparatus for simply attaching the heating element to a surface of the steering wheel.

BACKGROUND ART

A steering wheel is a driver-manipulated element of a steering system of an automobile. Many studies have been conducted with regard to the steering wheel for improving its esthetic appearance, convenience of holding, use of functional elements therewith, etc.

In particular, when starting to drive an automobile in cold weather, the temperature of the steering wheel is lower than that of the human body, which affects the driver and might pose a safety problem.

Accordingly, various apparatuses for heating the steering wheel to a temperature greater than that of the human body have been studied.

In a conventional technique for heating a steering wheel as disclosed in Korean Utility Model Application No. 1989-0020599, Korean Patent Application No. 1992-0000945, and Korean Utility Model Application No. 1996-16958, heating coils 3 are buried in a rim 10 portion of a steering wheel structure as shown in FIG. 1.

In order to bury the heating coils 3, as shown in FIG. 2, an insulating covering material 2 is covered on an outer-side of the core 1 and the heating coils 3 are bonded to an outer circumference of the insulating covering material 2. Afterwards, a surface of the rim 10 is finished using a finishing member 4 such as a synthetic resin.

In another method of burying the heating coils 3, as disclosed in Korean Utility Model Registration Application No. 1996-066213 (FIG. 3), after winding a heating wire 5 in a coil shape on an outer circumference of the core 1, the surface of the heating wire 5 is finished by using a synthetic resin mold 6.

However, as shown in FIG. 2, when the heating coils 3 having a flat shape are covered and fixed on an outer circumference of the insulating covering material 2, placing the thin heating coils 3 with uniform distances between the thin heating coils 3 is quite difficult, and a temperature deviation between areas in the rim 10 is generated in practice due to the non-uniform distances between the heating coils 3.

Also, as shown in FIG. 3, when the heating wire 5 is wound in a coil shape, a temperature deviation can be generated due to the non-uniform winding gaps, and, in particular, since only a single heating wire 5 is wound, when the heating wire 5 breaks during a working process, it is necessary to replace and re-wind the entire heating wire 5 again.

Also, when the heating coil 3 or the heating wire 5 is buried as described above, it takes a certain period of time for the heat to transfer from the heating coil 3 or the heating wire 5 to a surface of the rim 10.

A plane heater 14 for a steering wheel is disclosed in Japanese Patent Laid-Open Application No. 2007-290685 (FIG. 4). In the plane heater 14, heating wires 17 are fixed on a supporter 16 of a non-woven material. FIG. 5 is a photograph of an actual plane heater 14, and FIG. 6 is a photograph showing a steering wheel including the plane heater 14. As shown in FIG. 6, the plane heater 14 is mounted on an outer circumference of a rim of the steering wheel.

The plane heater 14 provides a cushion comfort area when a driver holds the steering wheel since the supporter 16 of the plane heater 14 is formed of a non-woven material.

However, when the plane heater 14 is used, the thickness (diameter) of the steering wheel is increased due to a thickness of the supporter 16 made of a non-woven material. Also, the steering wheel is finished by covering an actual wood 20 or a leather to protect the plane heater 14 and to gentrify a decoration. In this case, the thickness of the steering wheel is further increased.

The Cubic Printing (Curl-fit) method for a rim of a steering wheel of a vehicle disclosed in Korean Patent Registration No. 10-0472399 of the current inventor cannot be applied to the plane heater 14 having a rough surface as described above. That is, a transfer film on which a wood pattern for an esthetic decoration of the steering wheel is printed cannot be directly transferred onto the rough surface of the plane heater 14. For a decoration of the steering wheel, as shown in FIG. 6, after processing a wood piece 20, the processed wood piece 20 must be applied to the plane heater 14 (after processing two pieces of woods having a semi-circle shape, the two pieces of woods are joined to surround the surface of the plane heater 14). In this case, the manufacture of the steering wheel is time-consuming, and thus, expensive. Also, due to the low thermal conductivity of the wood piece 20, the overall thermal conductivity of the steering wheel is low, and accordingly, the heat of the plane heater 14 cannot be efficiently utilized.

DISCLOSURE

Technical Solution

The present invention provides a steering wheel having a heating element that applies heat to the steering wheel, can be readily mounted on the steering wheel, and a surface thereof can be finished by transferring a transfer film on which a decoration pattern is printed, and an apparatus for attaching the heating element to the steering wheel.

Advantageous Effects

First, the heating element can be readily attached to a surface of a rim of a steering wheel by using a pad member, and a thin transfer film on which a decoration pattern is printed can be transferred onto a surface of the heating element. Therefore, heat loss of the heating element can be minimized, and stable holding of the steering wheel is possible since the thickness (diameter) of the rim can be formed to be smaller than in the prior art.

That is, in a conventional steering wheel that uses a plane heater, it is essential to use a wood piece (or leather) having a large thickness. Therefore, there is a large heat loss on the way of transferring heat from the plane heater to the wood (or leather), and the rim has a large thickness (diameter), and thus, this conventional steering wheel is quite expensive. However, the steering wheel according to the present invention does not have these disadvantages.

Second, the heating element of the steering wheel according to the present invention includes a plurality of heating lines. Therefore, although a portion of the heating lines is electrically disconnected, continuous heat generation can be achieved from the rest of the heating lines.

Third, in the steering wheel according to the present invention, a conductive paste as a heating element is formed on a surface of a rim. Thus, the steering wheel provides soft comfort to the driver when the driver holds the steering wheel.

Fourth, the steering wheel according to the present invention has a low temperature deviation since a plurality of heating lines are formed with equal gaps from each other on a surface of a rim having a circular arc shape although a pad member formed of a soft material is used.

DESCRIPTION OF DRAWINGS

The above and other features and advantages of the present invention will become more apparent by describing in detail exemplary embodiments thereof with reference to the attached drawings in which.

BEST MODE

Figure 1:
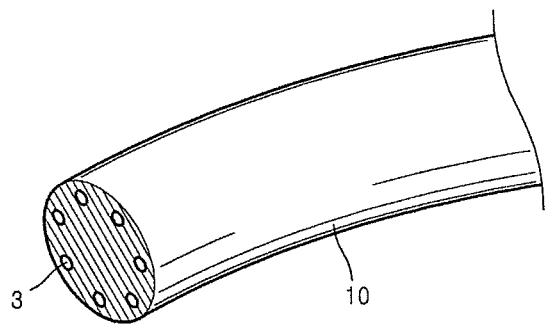
FIGS. 1 and 2 are schematic drawings of steering wheels having a conventional heating element.
Figure 2:
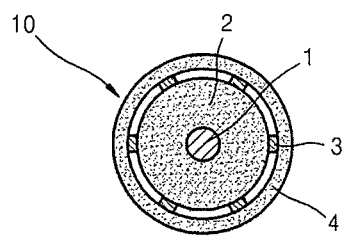
Figure 3:
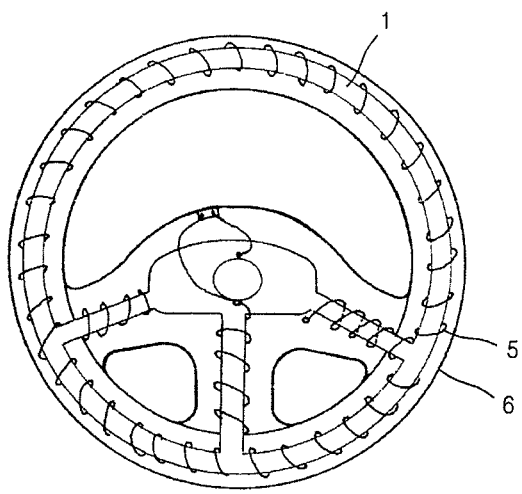
FIG. 3 is a schematic drawing of a steering wheel having another conventional heating element.
Figure 4:
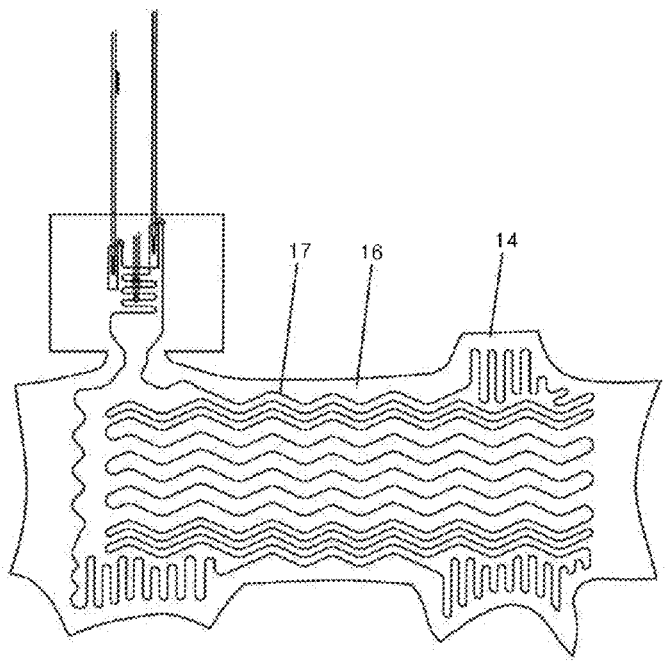
FIG. 4 is a schematic drawing of a plane heater as a conventional heating element.
Figure 5:
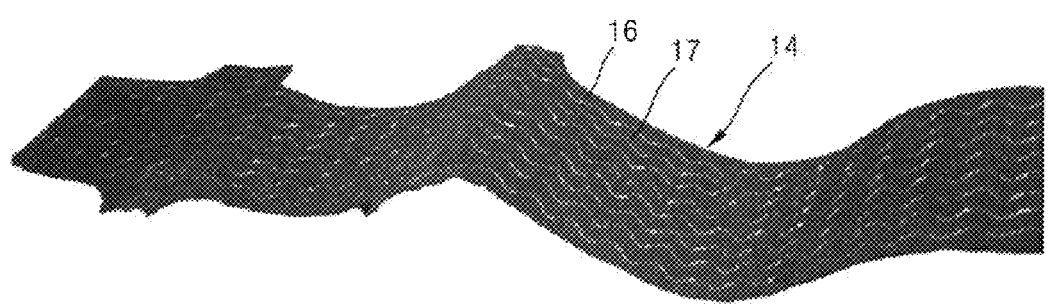
FIG. 5 is a photograph of the plane heater of FIG. 4.
Figure 6:
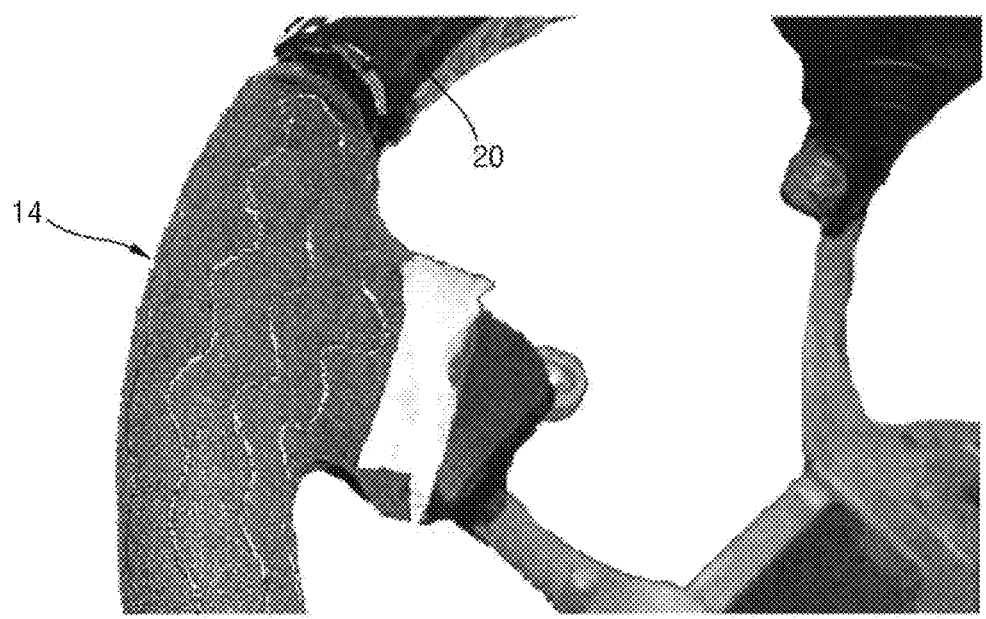
FIG. 6 is a photograph of a steering wheel onto which the plane heater of FIG. 5 is mounted.

The present invention provides a steering wheel having a heating element that applies heat to the steering wheel, can be readily mounted on the steering wheel, and a surface thereof can be finished by transferring a transfer film on which a decoration pattern is printed, and an apparatus for attaching the heating element to the steering wheel.

The present invention also provides a steering wheel having a heating element that can continuously generate heat even when a portion thereof is electrically disconnected, and an apparatus for attaching the heating element to the steering wheel.

The present invention also provides a steering wheel having a heating element that can reduce a temperature deviation by including a plurality of heating lines at equal gaps, and an apparatus for attaching the heating element to the steering wheel.

According to an aspect of the present invention, there is provided a steering wheel having a heating element in a rim, wherein the heating element may be an electrical conductive paste coated on a surface of the rim, and includes a plurality of heating lines that are electrically separated from each other, and a connection unit that electrically short-circuits the heating lines at both ends thereof, and power is supplied to the heating element through the connection unit.

The steering wheel may further include a decoration pattern layer on a surface of the heating element, wherein the decoration pattern layer is formed by transferring a transfer film on which a decoration pattern is printed on the steering wheel.

The steering wheel may further include a base layer between the heating element and the decoration pattern layer.

According to an aspect of the present invention, there is provided an apparatus for attaching a heating element onto a circular arc shaped rim of a steering wheel, the apparatus including: a molding plate having a plurality of line grooves on an upper surface thereof and connection grooves connected to the line grooves at both ends of each of the line grooves; a holder that reciprocally slides on the upper surface of the molding plate and injects a conductive paste into the line grooves and the connection grooves; a first moving means that reciprocally moves the holder on the upper surface of the molding plate; a pad member that is formed of a soft material and is tightly attachable and detachable to and from the molding plate, and onto which the conductive paste injected into the line grooves and the connection grooves is transferred; and a second moving means that moves the pad member up and down with respect to the molding plate and the rim, and reciprocally moves the pad member between the molding plate and the rim, wherein the conductive paste transferred to the pad member is coated on an outer circumference of the rim by tightly contacting the pad member on the outer circumference of the rim.

The holder may have a cup shape having an opened bottom, may be filled with the conductive paste, and may include a scraper on a lower edge thereof to prevent the conductive paste from escaping by tightly contacting the molding plate.

Each of the line grooves may be formed in a circular arc shape, and the pad member may be formed of a silicon material in a hollow tube shape and may have a circular arc shape like the line grooves.

Gaps between the line grooves may be gradually reduced from the center line groove towards both edges of the molding plate.

MODE FOR INVENTION

The present invention will now be described more fully with reference to the accompanying drawings in which exemplary embodiments of the invention are shown.

A steering wheel according to an embodiment of the present invention enables a driver to enjoy driving a vehicle in cold weather as the steering wheel is heated to a temperature greater than that of human body by employing a heating element.

In particular, according to the steering wheel according to an embodiment of the present invention, a film having a decoration pattern is directly transferred onto a surface of the heating element, an esthetic decoration pattern layer such as a wood pattern is used onto the heating element, so that a warm feeling is provided when a driver holds a rim of the steering wheel.

Also, the steering wheel can stably generate heat although a portion of the heating element is electrically disconnected, and also can generate heat with a reduced temperature deviation between portions of the rim.

Figure 7:
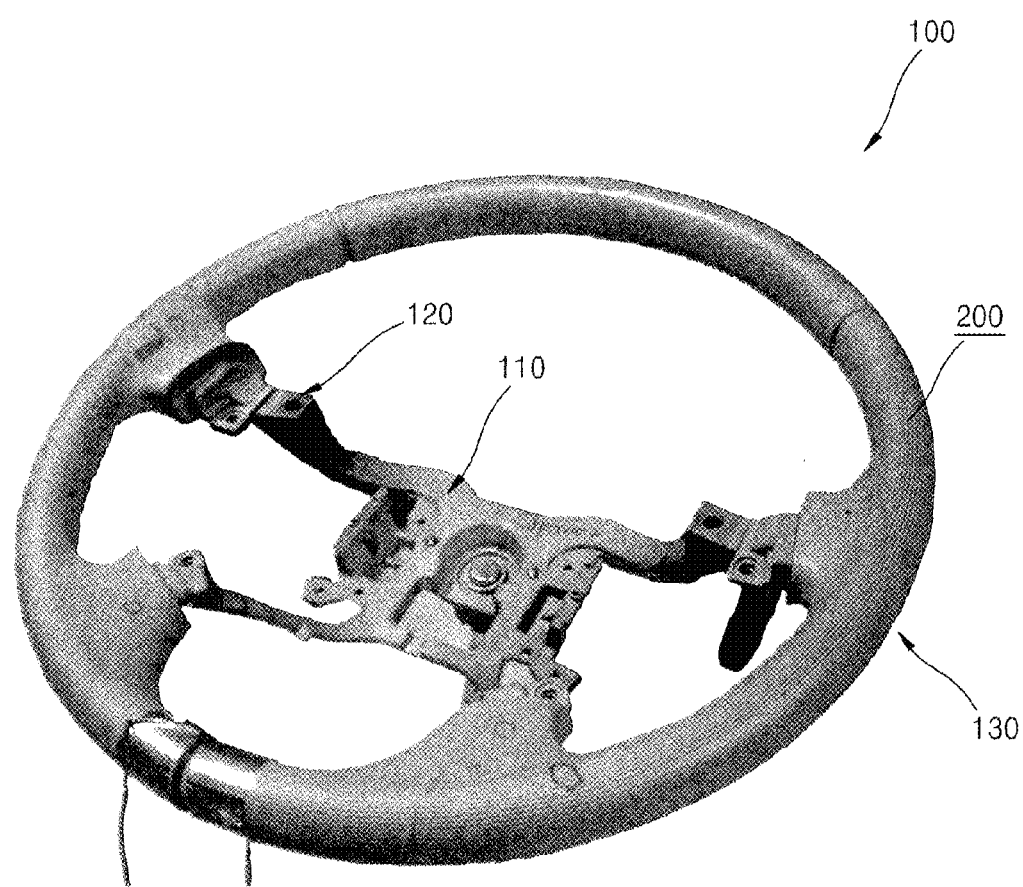
FIG. 7 is a photograph of a steering wheel having a heating element according to an embodiment of the present invention.
Figure 10:
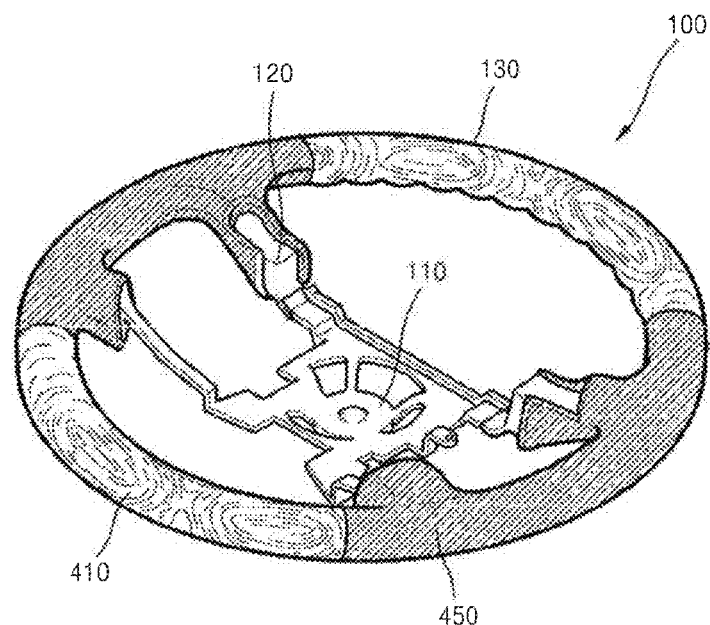
FIG. 10 is a perspective view of a steering wheel finished with a decoration pattern layer and leather after applying the heating element according to an embodiment of the present invention to a rim of the steering wheel.

FIG. 7 is a photograph of a steering wheel 100 having a heating element 200 according to an embodiment of the present invention. Referring to FIG. 7, the heating element 200 is coated on a surface of a rim 130. FIG. 10, as FIG. 7, is a perspective view of the steering wheel 100. A decoration pattern layer 410 is formed on a portion of the rim 130 on which the heating element 200 is coated, and leather 450 is combined to the rest portion of the rim 130.

In the current embodiment, the steering wheel 100 includes a boss 110, a spoke 120, and the rim 130, and the heating element 200 is mounted on a portion of the rim 130 where a driver mainly keeps the hands.

Figure 8:
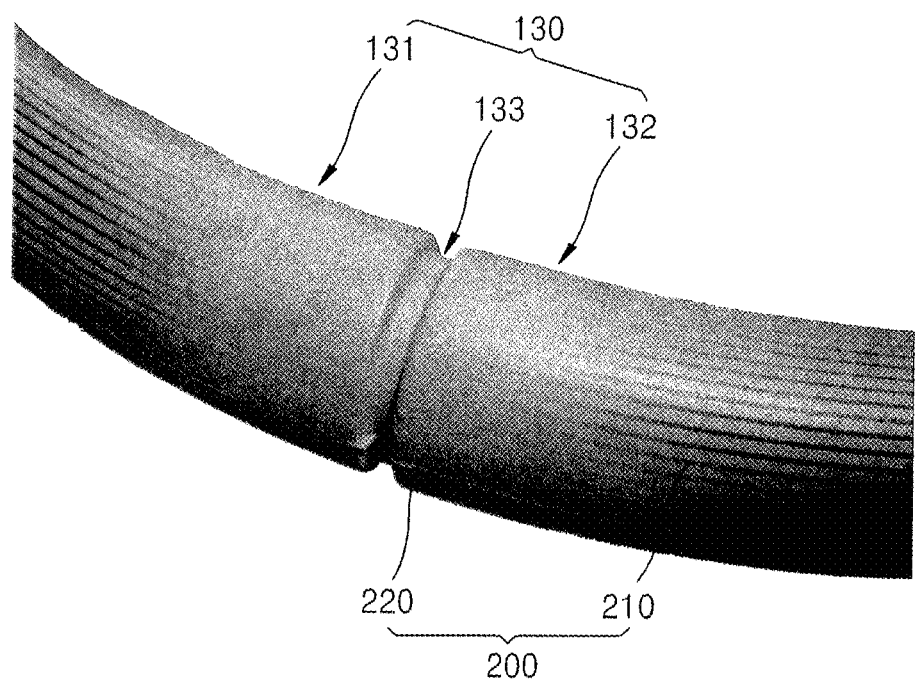
FIG. 8 is a photograph of a portion of the steering wheel of FIG. 7.
Figure 9:
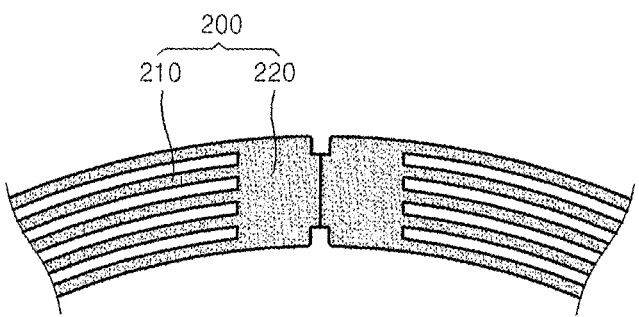
FIG. 9 is a schematic drawing of the steering wheel of FIG. 8.

FIG. 7 shows the steering wheel 100 according to an embodiment of the present invention. FIG. 8 is a photograph of a portion of the steering wheel of FIG. 7, and FIG. 9 is a schematic drawing of the steering wheel of FIG. 8. Referring to FIGS. 7, 8, and 9, the heating element 200 is an electrical conductive paste coated on a surface of the rim 130.

The heating element 200 includes a plurality of heating lines 210 that are electrically separated from each other, and a connection unit 220 that electrically short-circuits the heating lines 210 at both ends thereof. Power is supplied to the heating element 200 through the connection unit 220.

The connection unit 220 is formed in a region of the heating element 200 in order to simultaneously supply power to the heating lines 210.

In addition, in order to improve the appearance of the steering wheel 100, as shown in FIG. 10, the rim 130 is divided into a portion where a decoration pattern layer 410 is transferred and another portion where a leather 450 is covered. A wood pattern is formed of the decoration pattern layer 410. As shown in FIGS. 8 and 9, the rim 130 includes a first molding part 131 on which the decoration pattern layer 410 is transferred, a second molding part 132 where the leather 450 is covered, and a groove unit 133 between the first molding part 131 and the second molding part 132. After separately manufacturing the first molding part 131 and the second molding part 132 from each other, the leather 450 is covered on the second molding part 132, and afterwards, finishing of the leather 450 can be performed in the groove unit 133.

As described above, since the groove unit 133 is formed between the first molding part 131 and the second molding part 132, the electrical connection between the heating lines 210 coated on a circumference of the first molding part 131 and the heating lines 210 coated on a circumference of the second molding part 132 may be difficult.

Therefore, the connection unit 220 is formed by coating the entire surface of the heating element 200 in the groove unit 133 so that the heating lines 210 can be connected to each other.

Figure 11A:
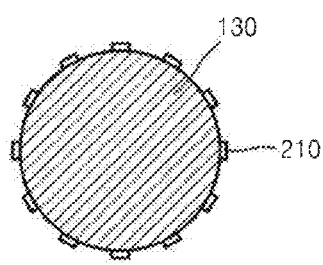
FIGS. 11A through 11D are schematic drawings for showing a sequence of forming a heating element, a base layer, and a decoration pattern layer on a surface of a rim according to an embodiment of the present invention.
Figure 11B:
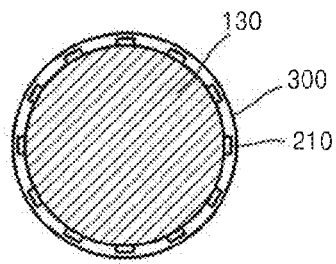
Figure 11C:
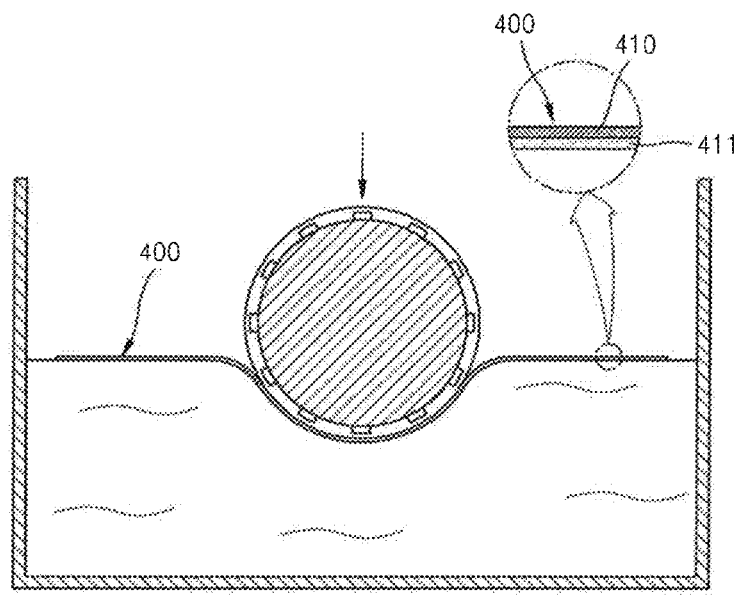
Figure 11D:
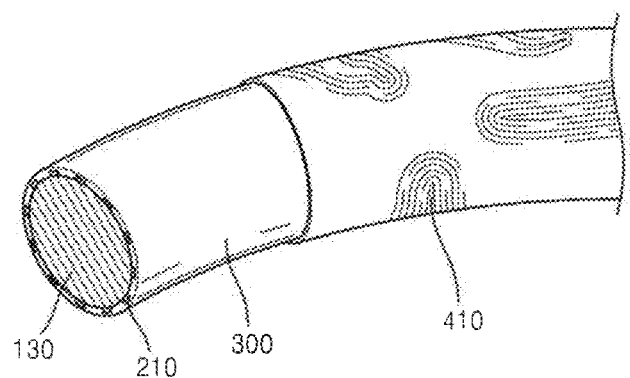

The decoration pattern layer 410 is formed on a surface of the heating element 200 by transferring a transfer film on which a decoration pattern is printed. Referring to FIG. 11C, a transfer film 400 includes the decoration pattern layer 410 on which a pattern such as a wood pattern is printed and a poly vinyl alcohol (PVA) layer 411. In a transfer process, after activating the decoration pattern layer 410 by applying an activator such as a thinner on an upper surface of the transfer film 400 floated on the surface of the water, the rim 130 is soaked below the surface of the water. Then, the decoration pattern layer 410 is transferred onto a surface of the rim 130 by water pressure.

At this point, due to the grooves between the heating lines 210, a three-dimensional effect of the decoration pattern can be obtained, and also, slipperiness along the rim 130 can be prevented.

Also, as shown in FIGS. 11A through 11D, a base layer 300 having a different color from the decoration pattern of the decoration pattern layer 410 is further formed between the heating element 200 and the decoration pattern layer 410. The base layer 300 emphasizes the appearance of the decoration pattern by including a paint having a different color from the pattern color of the decoration pattern layer 410.

The base layer 300 fills the grooves formed by the heating lines 210 between the heating lines 210, and thus, facilitates a smooth transfer of the decoration pattern layer 410 to the rim 130.

In the steering wheel 100 described above, since the heating element 200 coated on a surface of the rim 130 includes a plurality of heating lines 210, although one of the heating lines 210 is electrically disconnected, heat generation can continue from the remaining heating lines 210.

Also, in the rim 130 in which the groove unit 133 is formed between the first molding part 131 and the second molding part 132, since the connection unit 220 of the heating element 200 is formed in the groove unit 133 and the peripherals of the groove unit 133, the heating lines 210 coated on an outer circumference of the first molding part 131 and the heating lines 210 coated on an outer circumference of the second molding part 132 may be easily electrically connected to each other through the connection unit 220.

An apparatus for attaching the heating element 200 to the rim 130 of the steering wheel 100 will now be described.

Figure 12A:
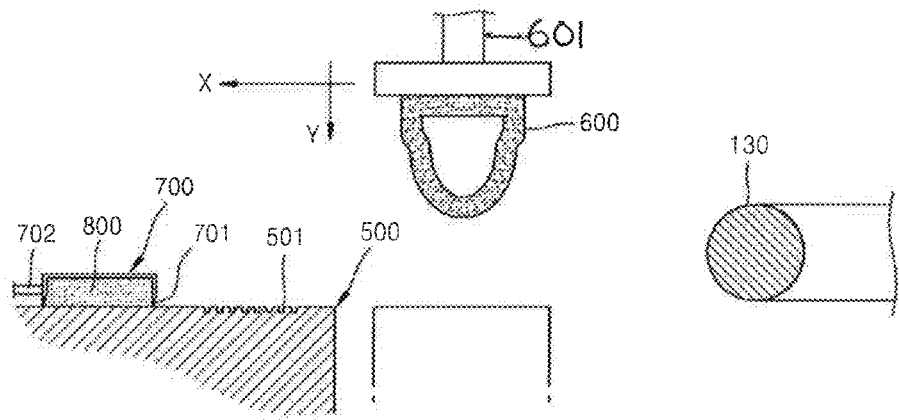
FIGS. 12A through 12H are drawings for describing an operation of an apparatus for forming a heating element on a surface of a rim according to an embodiment of the present invention.

FIGS. 12A through 12H are drawings for describing an operation of an apparatus for forming a heating element 200 on a surface of the rim 130 according to an embodiment of the present invention. Referring to FIG. 12A, the apparatus according to an embodiment of the present invention includes a molding plate 500 that includes line grooves 501 having a predetermined pattern on which a conductive paste 800 is coated, a holder 700 that injects the conductive paste 800 into the line grooves 501, and a pad member 600 that coats the conductive paste 800 onto the rim 130 by reciprocally moving up and down between the molding plate 500 and the steering wheel 100.

Figure 13:
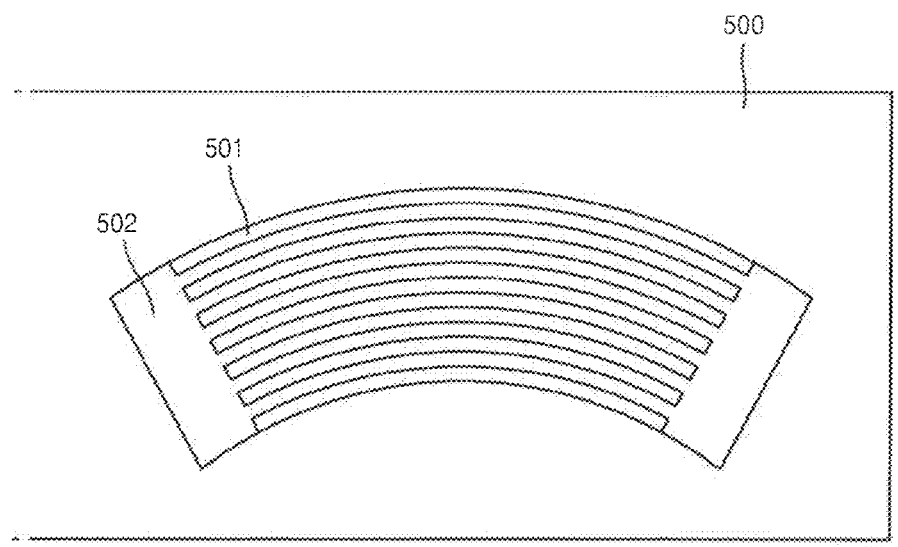
FIG. 13 is a plan view of a molding plate according to an embodiment of the present invention.

Referring to FIGS. 12A and 13, the molding plate 500 has a structure in which a plurality of the line grooves 501 on an upper surface thereof, and connection grooves 502 connected to each of the line grooves 501 are formed on both ends of the line grooves 501.

The line grooves 501 are formed in a circular arc shape having the same curvature as the rim 130.

The holder 700 that reciprocally slides on an upper surface of the molding plate 500 and injects the conductive paste 800 into the line grooves 501 and the connection grooves 502 has a cup shape having an opened bottom. The holder 700 is filled with the conductive paste 800, and includes a scraper 701 that prevents the conductive paste 800 from leaving from the holder 700 by being tightly attached to the molding plate 500 on a lower edge of the holder 700.

The holder 700 is formed in a cup shape to accommodate the conductive paste 800, and thus, prevents the conductive paste 800 from hardening although the conductive paste 800 is used for a certain period of time.

The holder 700 may reciprocally move by a first moving means, such as a cylinder 702, generally parallel to the upper surface of the molding plate 500.

The pad member 600 may be tightly attachable and detachable to the molding plate 500, and moves the conductive paste 800 injected into the line grooves 501 and the connection grooves 502 to a surface of the rim 130.

Figure 14:
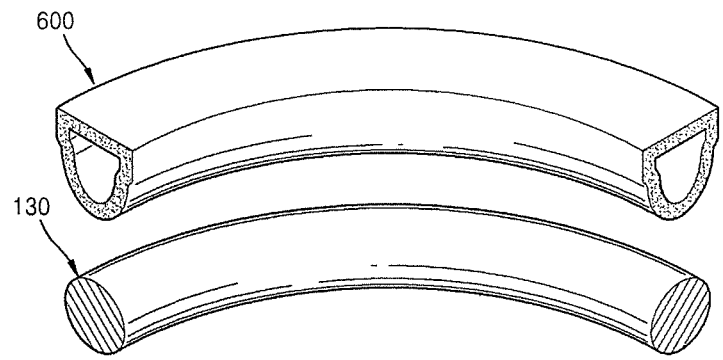
FIG. 14 is a perspective view of a pad material according to an embodiment of the present invention.

Referring to FIGS. 12A and 14, the pad member 600 is a hollow tube, is formed of a soft silicone material, and is formed in a circular arc shape as the line grooves 501 and the rim 130. The pad member 600 is able to elevate in a Y direction, transverse to the molding plate 500 and the rim 130, and may reciprocally move in an X direction between the molding plate 500 and the rim 130. The Y-direction reciprocal movement of the pad member 600 may be achieved by a second moving means such as cylinder 601.

The above apparatus is operated as follows.

Figure 12B:
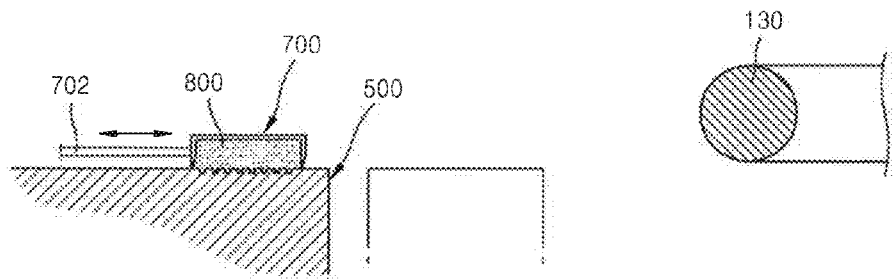

Referring to FIGS. 12A and 12B, the holder 700 injects the conductive paste 800 into the line grooves 501 and the connection grooves 502 while reciprocally sliding on an upper surface of the molding plate 500. At this point, the conductive paste 800 coated on the upper surface of the molding plate 500 is re-accommodated in the holder 700 by the scrapping of the scraper 701.

Figure 12C:
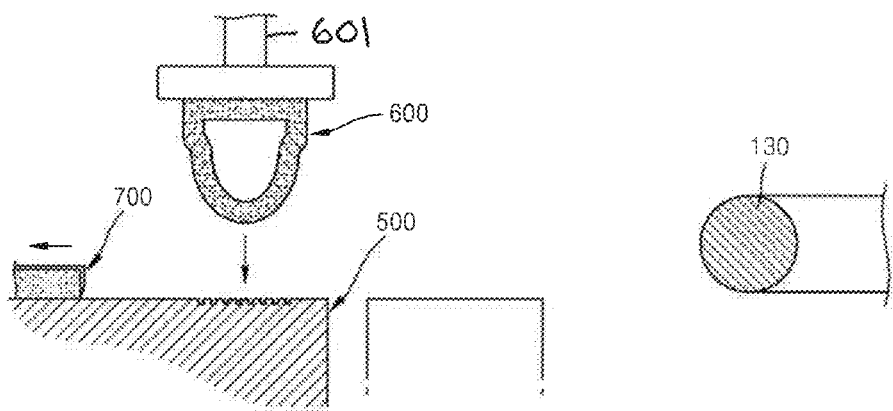
Figure 12D:
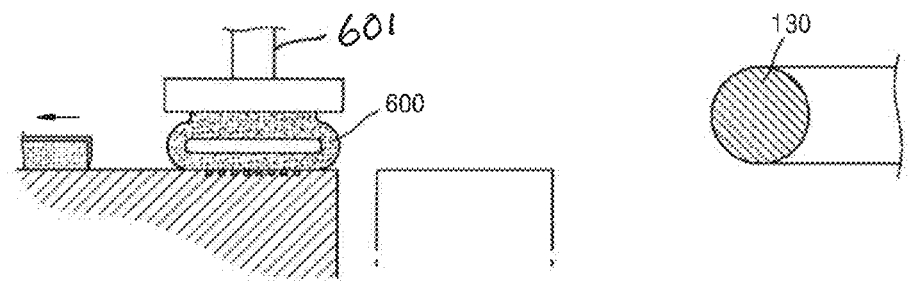
Figure 12E:
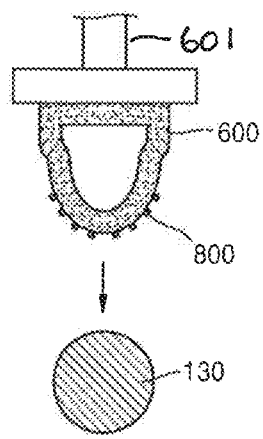

Next, as shown in FIGS. 12C and 12D, after the holder 700 is retreated, the pad member 600 tightly contacts the molding plate 500 as the pad member 600 descends, and as shown in FIG. 12E, after the pad member 600 is separated from the molding plate 500, the conductive paste 800 accommodated in the line grooves 501 and the connection grooves 502 are transferred to a surface of the pad member 600.

Figure 12F:
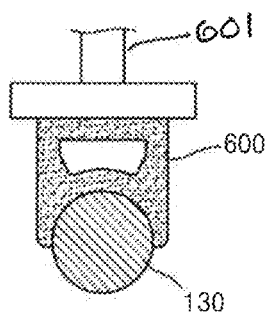

In this state, the pad member 600 moves to above the rim 130 of the steering wheel 100, and as shown in FIG. 12F, the pad member 600 presses a surface of the rim 130 as the pad member 600 descends.

Figure 12G:
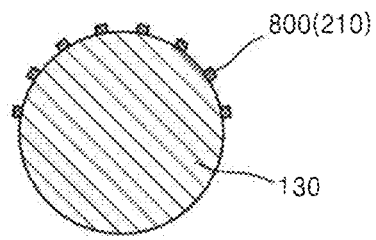

At this point, the pad member 600 formed of a silicon material is elastically deformed to surround a half surface of the rim 130 having a curved surface, and as shown in FIG. 12G, the conductive paste 800 adhered to the surface of the pad member 600 is transferred to the surface of the rim 130.

Figure 12H:
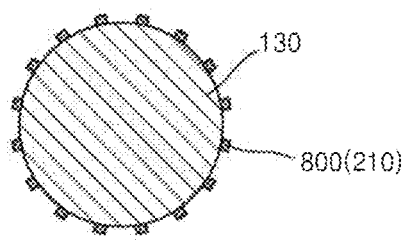

When the conductive paste 800 is transferred to the upper surface of the rim 130, the rim 130 is overturned, and the same operation described above is repeated onto the rim 130. Then, as shown in FIG. 12H, the conductive paste 800 can be transferred to the remaining half surface of the rim 130.

FIGS. 7 and 8 are photographs of the steering wheel 100 on which the heating element 200 is coated on a surface of the rim 130 as a result of the operation described above.

After coating the heating element 200 on the surface of the rim 130, a test was performed by applying power to the heating element 200. The result showed that the surface of the rim 130 was maintained at a temperature between 70~89° C. and a stable heat generation was observed for a long period of time (continuous operation for 15 days). The temperature may be controlled by using a controller (not shown).

Also, when one of the heating lines 210 of A in FIG. 7 was disconnected, it was found that heat was generated from the remaining heating lines 210, and also, although there was a rapid resistance variation, it was found that a stable power supply can be achieved without an automatic disconnection of power supply.

Meanwhile, as shown in FIG. 12F, when the pad member 600 is elastically deformed while the pad member 600 presses the surface of the rim 130, the pad member 600 gradually sags from the center portion to the edge portions thereof, and thus, gaps between the heating lines 210 to be transferred to the surface of the rim 130 are gradually increased. In this case, a minute temperature difference may be caused on the surface of the rim 130 and the driver may feel a relative temperature deviation.

Figure 15:
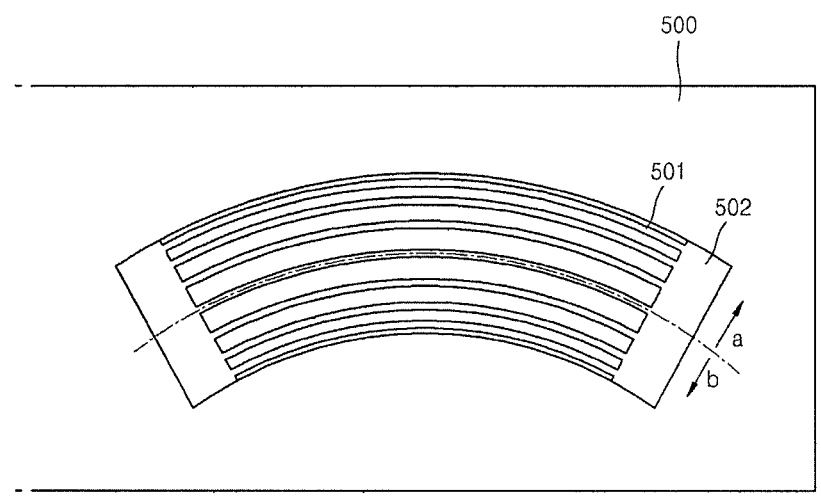
FIG. 15 is a plan view of a molding plate according to another embodiment of the present invention.

Therefore, in another embodiment of the present invention as shown in FIG. 15, the gaps between the adjacent line grooves 501 are formed to be gradually reduced from the center line groove 501 towards both edges (a direction and b direction) of the molding plate 500.

In this case, although the pad member 600 gradually sags from the center towards the edges thereof when the pad member 600 is pressed by being elastically deformed on the surface of the rim 130, the gaps between the heating lines 210 coated on the surface of the rim 130 may be uniform, and thus, the temperature deviation as described above can be reduced.

A heating element is employed to a steering wheel of a vehicle. Thus, a driver can drive a vehicle safely in cold weather by holding a warm steering wheel. The heating can be continued on a remaining portion of the heating element although a portion of the heating element is electrically disconnected. The steering wheel has a small diameter although an esthetic decoration pattern such as a wood pattern is employed, and thus, improves driving convenience.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. An apparatus for attaching a heating element onto a circular arc-shaped rim of a steering wheel, the apparatus comprising:
   a molding plate having an upper surface with a plurality of grooves with respective ends, and connection grooves connected to the ends of the grooves;
   a holder adapted to slide reciprocally on the upper surface of the molding plate and adapted to inject a conductive paste into the grooves and the connection grooves;
   a first cylinder adapted to move reciprocally the holder on the upper surface of the molding plate in a first direction so that the holder slides over the grooves and the connection grooves and injects the conductive paste into the grooves and the connection grooves, and in a second direction, opposite the first direction;
   an elastically deformable pad member of a soft material adapted to be brought into contact with the molding plate and with the grooves and the connection grooves filled with the conductive paste, and adapted to be separated from the molding plate with the conductive paste transferred from the grooves and the connection grooves to an external surface of the elastically deformable pad member; and
   a second cylinder adapted to move the elastically deformable pad member transverse to the molding plate and the rim of the steering wheel, and adapted to move reciprocally the elastically deformable pad member toward, into contact with, and away from the molding plate, and toward, into contact with, and away from the rim of the steering wheel, wherein, in operation of the second cylinder, the conductive paste transferred to the external surface of the elastically deformable pad member, when the elastically deformable pad member is in contact with the upper surface of the molding plate, is configured to transfer and form a coating of lines of the conductive paste on an outer circumference of the rim of the steering wheel when the elastically deformable pad member is configured to contact the outer circumference of the rim of the steering wheel.

2. The steering wheel of claim 1, wherein the holder has a cup shape having an open bottom, is filled with the conductive paste, and comprises a scraper on a lower edge of the holder adapted to prevent the conductive paste from escaping by contacting the molding plate.

3. The apparatus of claim 1, wherein
each of the grooves has a circular arc shape, and
the elastically deformable pad member is a silicone material having a hollow tubular shape with a circular arc matching the circular arc shape of the grooves.

4. The apparatus of claim 3, wherein
the grooves are mutually separated by gaps between the grooves, and
the gaps are gradually reduced from a center groove, of the plurality of grooves, outward from the center groove.

5. The apparatus of claim 2, wherein
each of the grooves has a circular arc shape, and
the elastically deformable pad member is a silicone material having a hollow tubular shape with a circular arc matching the circular arc shape of the grooves.

6. The apparatus of claim 1, wherein
the upper surface of the molding plate is substantially planar,
the rim of the steering wheel has a substantially circular cross-section,
the elastically deformable pad member has, in a cross-section taken transverse to the upper surface of the molding plate, a hollow tubular shape, and
the external surface of the elastically deformable pad member is adapted to take a planar shape when pressed against the upper surface of the molding plate by the second cylinder, and is adapted to take a concave shape when pressed against the outer circumference of the rim of the steering wheel by the second cylinder.

7. The apparatus of claim 6, wherein the external surface of the elastically deformable pad member is convex when the elastically deformable pad member is not deformed by any externally applied force.

* * * * *